March 14, 1944.   F. E. HAND   2,344,301
AGRICULTURAL IMPLEMENT
Filed Oct. 23, 1940
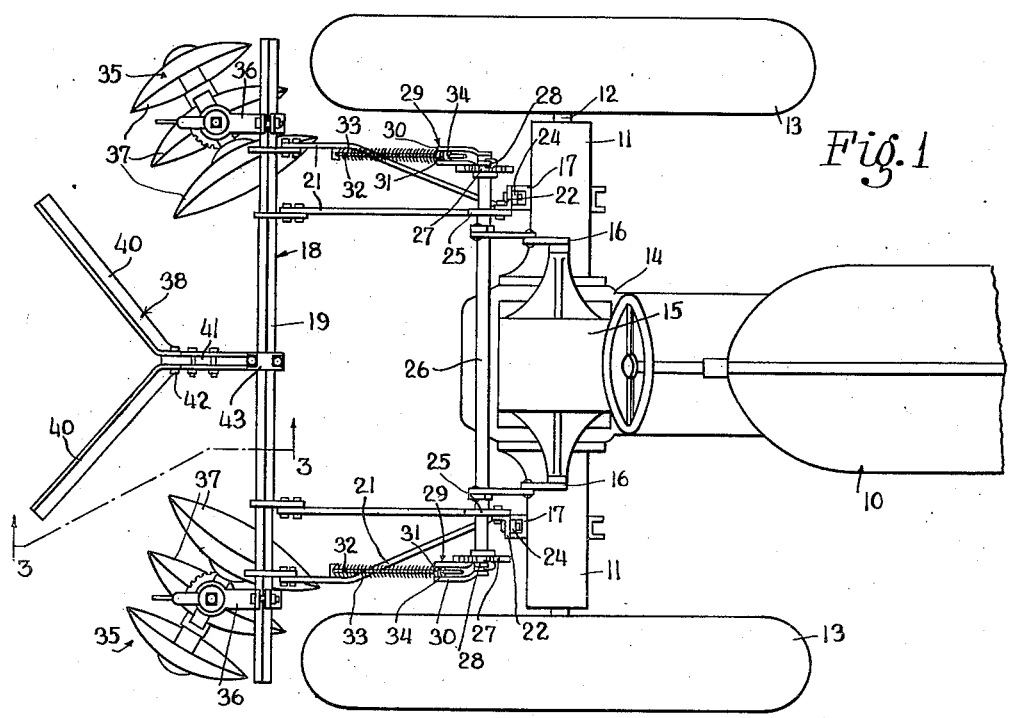
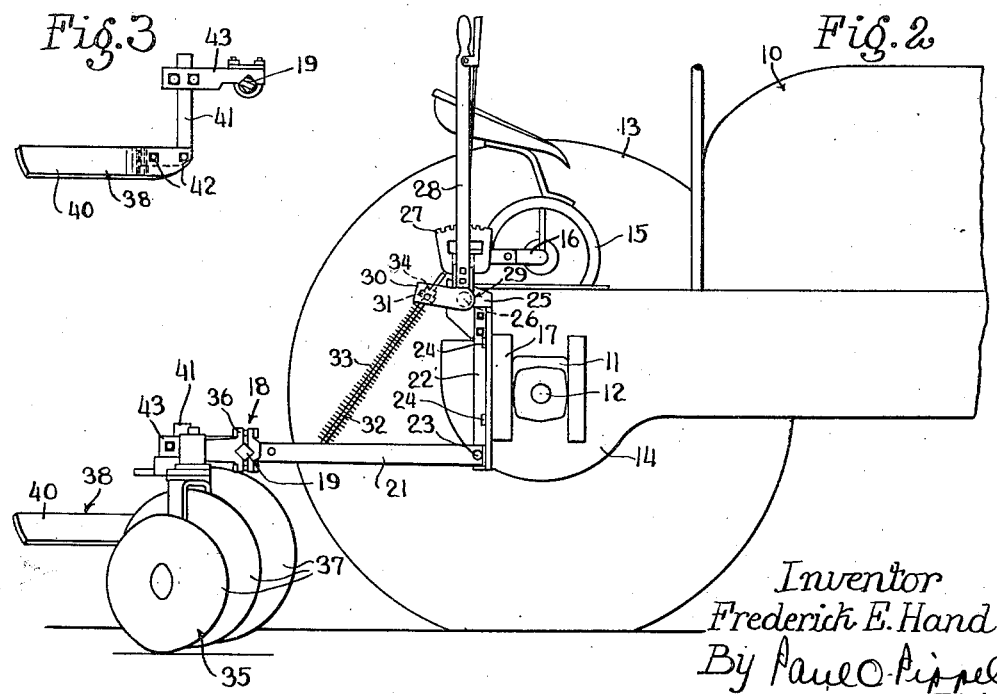
Inventor
Frederick E. Hand
By Paul O. Pippel
Atty.

Patented Mar. 14, 1944

2,344,301

UNITED STATES PATENT OFFICE 2,344,301

AGRICULTURAL IMPLEMENT

Frederick E. Hand, Canton, Ill., assignor to International Harvester Company, a corporation of New Jersey Application October 23, 1940, Serial No. 362,362

5 Claims. (Cl. 97—47)

This invention relates to agricultural implements, and more particularly to implements particularly adapted for the forming and preparing of beds in which seed is to be planted.

It is an object of the present invention to provide an improved bedding arrangement in which is incorporated a device for automatically leveling the bed at the same time that the bed is thrown up by the usual bedding tools.

It is another object of the invention to provide in a bedding arrangement a transverse tool bar to which not only the bedding tools may be attached, but to which the leveling device may be attached.

It is a still further object of the invention to so locate the leveling device that blades thereof would take substantially the same angle as the throwing up bedding tools as a result of which the leveling device may be located between the opposing bedding tools and thereby make for compactness of the entire arrangement.

According to the present invention there has been provided for association with the bedding arrangement, a leveling device including a pair of blades and means for attaching this leveling device to the tool-supporting means in such a manner that the tops of the beds formed by the usual bedding tools will be leveled off. These blades are connected together in diverging relationship and arranged at an angle to thereby permit the connection of leveling tools close to the bedding tools which are usually angled during their working operation with respect to the line of draft of the implement. The tool-supporting means may include a transverse tool bar and by the use of clamping connections, the bedding tools and the leveling device can be connected to the tool bar, this manner of connection providing a tool bar permitting the connection of these elements at any number of locations laterally with respect to the tool-supporting frame, also to provide vertical adjustment so that flat topped beds of any desired height can be finished in one operation. Heretofore, bed forming and top flattening have been separate operations.

For other objects and for a better understanding of the invention, reference may be had to the following detailed description, in which:

Figure 1 is a plan view of the tractor and the implement attachment including the features of the present invention;

Figure 2 is a view in elevation of a tractor and of the bedding attachment; and, Figure 3 is a view in elevation of the leveling device and its connection to the transverse tool bar taken along the line 3—3 of Figure 1.

Referring now particularly to Figures 1 and 2, there is shown a tractor indicated generally at 10 having rear axle housings 11 through which extends the rear axle 12 having connected thereto the rear drive wheels 13. Between the rear axle housings 11 there is located the transmission and drive or differential housing 14 on which is mounted the power lift mechanism 15 which has at opposite sides thereof working arms 16. This power lift device 15 may be of any form and is principally adapted to be operated by a driving mechanism forming a part of the tractor by connections therewith well known and illustrated by the prior art.

On each of the rear axle housings is connected a bracket structure 17 adapted for the connection of the various forms of agricultural implements thereto. With the implements so connected to the tractor any tool-carrying frame to which the working tool may be connected when taken with the tractor will provide a tool-supporting means for the connection of individual working tools thereto.

The bedding attachment of the present arrangement includes a tool-supporting frame indicated generally at 18. This tool-supporting frame includes a transverse tool bar 19 to which there are connected forwardly extending draft members 21 adapted to be pivotally connected respectively to the vertically extending members 22 as indicated at 23. These vertically extending members 22 in turn serve as attaching portions for connection of the tool-supporting frame to the brackets 17 on the rear axle housing of the tractor. These vertically extending members 22 are connected by bolt means 24 to the bracket structure 17. The upper ends of these vertically extending members 22 include rearwardly extending plate members 25, and the members 25 have in turn journaled therein a rock-shaft 26 extending laterally across the tractor. The rock-shaft 26 carries quadrants 27, over which are respectively operated adjusting levers 28 journaled to the rock-shaft 26 by bell crank elements 29 which respectively have rearwardly extending lifting arms 30 to which are connected by means of a trunnion 31 the upper ends of lifting rods 32. The lower ends of the lifting rods are in turn connected to the draft members 21. The lift rods may include the usual pressure springs 33 and lifting may be effected through a collar element 34 connected to the upper end of the lift rod. The levers 28, being located at each side of the tractor, serve to level the frame transversely and to regulate the height of the bed. The rock-shaft 26 is connected to the arm 16 of the power lift 15 to be rocked thereby to effect lifting of the supporting frame to a transport position.

The tool bar 19 serves as a means to which the individual bedding tools are connected to the tool-supporting frame 18. To the outer portions of this tool bar are connected respectively two bedding tools 35 which are arranged to be in opposing relationship to each other as well as spaced from each other depending upon the width of the bed which is desired to be thrown up. These bedding tools are fastened to the tool bar by clamping means 36 at any location along the transversely extending tool frame or along the tool bar. These bedding tools are not only arranged in opposing relationship, but also are arranged at an angle with respect to the line of draft of the implement. Each of the bedding tools includes a plurality of individual disks 37.

Also connected to the tool bar is a leveling device whereby the top of the bed thrown up by the bedding tools 35 is immediately leveled off during the same operation of the throwing up of the beds. The leveling device is indicated generally at 38 and includes a pair of blades 40 each of which is inclined as well with respect to the line of draft of the implement and to such an extent as to substantially cover the entire top of the bed. Heretofore, this operation of leveling has been done, if done at all, by a separate machine at the time following the throwing up of the beds by the bedding tools 35 thereby requiring a separate passing over the same ground for effecting leveling of the beds. By the present invention this leveling is effected at the same time as the beds are thrown up.

By having these blades 40 extending at an angular relationship with respect to the line of draft of the implement, the blades may be brought close to the tool bar thereby making for compactness of the entire arrangement. It will be noted that the blades 40 have an angular arrangement with the line of draft. As a means for attaching the blades 40 to the tool bar, there is provided a vertically extending standard member 41 which has the blades connected by their forward ends attached to the same by means of the bolts 42. This standard 41 is in turn connected to the tool bar 19 by a clamping means 43. This clamping means 43 may extend rearwardly so that the leveling device may be located at a location in rear of the bedding tools 35. By having the blades 40 arranged at an angle it will be noted that the bedding tools may be brought closer to each other without the necessity of any rearward adjustment of the leveling device. In other words, the bedding tools may be brought to form beds of very narrow width and the leveling device may still be left in its regular location on the tool bar.

While various changes may be made in the detail construction of the arrangement of the present invention, it shall be understood that such changes shall be within the spirit and scope of the invention as defined in the appended claims.

What is claimed is:

1. In combination, a tractor, a tool-supporting frame connected to the tractor and including a transversely extending tool bar, a pair of bedding tools connected to the tool bar, the respective bedding tools being arranged on the bar in opposing and spaced relationship with respect to each other, and a device for leveling off the dirt on the top of the bed formed by the bedding tools connected to the tool bar between the respective bedding tools.

2. In a bed-forming implement, tool-supporting means including a transversely extending tool bar, a pair of bedding tools, each of which is attachable to the tool bar, the said tools being arranged on the tool bar in opposing and transversely spaced relationship with respect to each other, a device for leveling the top of the bed formed by the bedding tools, and means for attaching the leveling device to the tool bar.

3. In a bed-forming implement, tool-supporting means including a transversely extending tool bar, a bedding tool adapted to be clamped to the tool bar, a device for leveling the top of the bed formed by the bedding tool, and means for clamping the leveling device to the tool bar.

4. In an implement advanceable in the direction of a forward side thereof to form an earth bed, tool-supporting means including a tool bar, a pair of bedding tools depending from the tool-supporting means in variable spaced relation laterally of the implement for throwing up earth into said bed from opposite of its sides, and means for sweeping the top of said bed to produce a predetermined contour thereto including blades depending from said tool bar between and rearwardly of said bedding tools and extending divergingly backwardly with respect to the implement at an elevation to sweep the earth thrown up by the bedding tools.

5. In a bed-forming agricultural implement having a tool-supporting means carried over such earth bed, a standard connectable with said tool-supporting means in downwardly projecting relation with respect thereto, and a pair of sweeper blades adapted to sweep the top of the bed having respective shank portions disposed on opposite lateral sides of a downwardly projecting portion of said standard and respective blade portions projecting backwardly from said shank portions and in diverging relation with one another.

FREDERICK E. HAND.